United States Patent [19]

Böbel et al.

[11] Patent Number: 5,564,830
[45] Date of Patent: Oct. 15, 1996

[54] METHOD AND ARRANGEMENT FOR DETERMINING THE LAYER-THICKNESS AND THE SUBSTRATE TEMPERATURE DURING COATING

[75] Inventors: Friedrich Böbel, Uttenreuth; Norbert Bauer, Erlangen, both of Germany

[73] Assignee: Fraunhofer Gesellschaft zur Forderung der angewandten Forschung e.V., Germany

[21] Appl. No.: 183,176

[22] Filed: Jan. 18, 1994

[30] Foreign Application Priority Data

Jun. 3, 1993 [DE] Germany .................... 43 18 520.7

[51] Int. Cl.$^6$ .................. G01J 5/62; G01J 5/00; G01B 11/06
[52] U.S. Cl. .............. 374/126; 374/9; 374/142; 364/557; 437/8; 356/381
[58] Field of Search ................ 374/126, 7, 9, 374/130, 142; 364/557; 437/8; 356/381, 382, 445

[56] References Cited

U.S. PATENT DOCUMENTS

| | | | |
|---|---|---|---|
| 4,417,822 | 11/1983 | Stein et al. | 374/129 |
| 4,549,079 | 10/1985 | Terasaka, et al. | |
| 4,647,774 | 3/1987 | Brisk et al. | |
| 4,647,775 | 3/1987 | Stein. | |
| 4,919,542 | 4/1990 | Nulman et al. | 374/126 |
| 4,956,538 | 9/1990 | Moslehi | 374/126 |
| 4,979,133 | 12/1990 | Arima et al. | 364/557 |
| 4,984,902 | 1/1991 | Crowley et al. | 374/126 |
| 5,029,117 | 7/1991 | Patton | 364/557 |
| 5,156,461 | 10/1992 | Moleshi et al. | 374/121 |
| 5,180,226 | 1/1993 | Moleshi | 374/127 |
| 5,231,595 | 7/1993 | Makino et al. | 374/126 |
| 5,239,488 | 8/1993 | Markham et al. | 374/9 |
| 5,282,017 | 1/1994 | Kasindorf et al. | 374/126 |
| 5,308,161 | 5/1994 | Stein | 374/126 |
| 5,326,172 | 7/1994 | Ng | 364/557 |
| 5,326,173 | 7/1994 | Evans et al. | 374/9 |

FOREIGN PATENT DOCUMENTS

| | | |
|---|---|---|
| 0408015 | 1/1991 | European Pat. Off. . |
| 0470646 | 2/1992 | European Pat. Off. . |
| 1004755 | 3/1983 | U.S.S.R. .................... 374/7 |
| 1395939 | 5/1988 | U.S.S.R. .................... 374/7 |
| WO92/19944 | 11/1992 | WIPO . |

OTHER PUBLICATIONS

Chr. M. Van der Meer, et al., "The Emission Coefficient of Silicon Coated with $Si_3N_4$ or $SiO_2$ Layers," J. Appl. Phys., vol. 47, No. 2, 652–655 (Feb. 1976).

D. T. Larson, et al., "Surface Film Thickness Determination By Reflectance Measurements," Appl. Optics, vol. 12, No. 6, 1271–1275 (Jun. 1973).

H. Grothe and F. G. Boebel, "In-situ control of Ga(Al)As MBE layers by pyrometric interferometry," Journal of Crystal Growth, vol. 127, 1010–13 (1993).

(List continued on next page.)

Primary Examiner—Diego F. F. Gutierrez
Attorney, Agent, or Firm—Eckert Seamans Cherin & Mellott

[57] ABSTRACT

The invention describes a procedure and an arrangement for measurement of temperature and thickness of layer during a deposition or coating process. As coating or depositing processes known technologies of semi-conductor manufacturing arrangements, plasma devices, ion devices, and other dry-etching arrangements may be used. The invention can also be applied to the manufacture of optical coatings. As a consequence of interference of the thermal radiation of the substrate at the growing layer, the emissivity $\epsilon$ changes continuously during coating or depositing, therefore, a pyrometric measurement of temperature may not be applied. This basic problem is solved by the invention, which uses a reflectometer, which determines the reflectivity R of the wafer. According to the law of conservation of energy $\epsilon=1-R$ so that with said reflectometer the actual emissivity of the whole (multi-layer) system may be determined. The measurement of temperature then is effected by means of a determination equation. Concurrently the thickness is determined by a comparison of the reflectometer-curve and a theoretical dependency of thickness of layer.

9 Claims, 1 Drawing Sheet

OTHER PUBLICATIONS

Solid State Electronics, 1975, vol. 18, pp. 110–112, M. Sandera "Dialectic Film Thickness Measurement From The Reflection Relations".

Measurement, Mar. 1993, No. 1, pp. 55–64, Chen et al, "Emissivity correction in infrared microthermography".

H. Moller, et al., "Real Time, In Situ, High Resolution Temperature measurement During Film Growth Using multiple Wavelength (HWPI) And Reflexion Supported Pyrometric Interferometry (RSPI)", IEEE/SEMI Advanced Semiconductor Manufacturing Conference, Boston, MA (Sep. 30–Oct. 1, 1993).

E. S. Hellman, et al., "Infrared Transmission Spactroscopy of GaAs During Molecular Beam Epitaxy", J. Cyrs. Grow., 81, 38–42 (1987).

F. G. Boebel, et al., "Simultaneous In Situ Measurement of Film Thickness And Temperature By Using Multiple Wavelenghts Pyrometric Interferometry (MWPI)", IEEE Trans. Semi. Mfg., vol. 6, No. 2 112–118 (1993).

T. Farrell, et al., "Dynamic Optical Reflectivity To Monitor The Real Time Metal Organic Molecular Beam Epitaxial Growth of AlGaAs Layers", Appl. Phys. Lett., 59 (10), 1203–1205 (1991).

METHOD AND ARRANGEMENT FOR DETERMINING THE LAYER-THICKNESS AND THE SUBSTRATE TEMPERATURE DURING COATING

FIELD OF INVENTION

The invention relates to a method for determining the thickness of a layer of coating material and the temperature of the substrate while coating the substrate in arrangements for the manufacture of semiconductors. The invention further relates to a method for depositing-arrangements by use of a detected temperature-radiation at the growing layer on the substrate. The invention also relates to an arrangement for carrying out the mentioned method.

BACKGROUND OF THE INVENTION

The measurement of the substrate temperature is one of the most important aids for the control of coating processes. The crystallization behaviour, the rate of epitaxial growth and diffusion, etc., are all functions of the substrate temperature which influences the thermodynamic, chemical, and physical processes. The measurement of temperature is of significant importance in the fields of the manufacture of: semiconductor and electronic components, coated optics, high-capacity optical components, integrad optical circuits ("IOC"), semiconductor laser diodes, etc.

This is also true for all processes where coating technologies are used, e.g. chemical vapor deposition ("CVD"), molecular beam epitaxy ("MBE"), thermal oxidation, and cathode sputtering or plasma polymerization.

As a consequence of various process conditions—e.g., high temperatures, ultra high vacuum ("UHV"), chemically reactive surroundings, rotating substrates)—direct measurement of the substrate temperature via calibrated platinum film resistances (i.e., thermocouples) or other contact thermometers is typically not possible. Accordingly, the substrate temperature is usually determined by means of pyrometrical measurements. Because of interference at the interfaces of the growing layers, the measured temperature-radiation intensity is subject to changes in the temperature T as well as to variations of layer/coating-thickness d (film).

Therefore, during the coating process, the pyrometer signal will oscillate due to the changing layer-thickness even if the temperature remains constant.

As a consequence of this interference phenomenon, the emissivity $\epsilon$ continuously changes during coating so that a pyrometrical measurement of temperature is not feasible. Particularly problematic is the pyrometrical measurement of temperature in multiple layer systems where the actual emissivity depends on: the thickness of all the layers, the optical constants of all the layers, the temperature dependencies of the optical constants, the angle of incidence, and the monitoring wavelength.

In situ measurement systems for the real time determination of temperature during coating have been known only since 1988. The procedure described in E. S. Hellmann and J. S. Harris, J. Crys. Grow., 81, 38–42, (1988) is based on the temperature dependence of the bandgap of semiconductor wafers and can only be used in processes where the process chamber geometry allows for a transmission measurement and where the band edge of the substrate is in the detectible spectroscopic field. Thus, for example, the temperature of quartz or metal substrates cannot be measured.

Therefore, the procedure has been restricted to molecular beam epitaxy ("MBE") arrangements designed for indium free mounting, i.e. the substrate is not, as usual, fixed on a molybdenum block, but rather is mounted directly in front of the heating elements.

Furthermore, in situ temperature measurement methods depend on the functional relationship between the refractive-index and temperature (e.g., ellipsometrical temperature measurement), which requires an exact knowledge of the temperature dependence of the material constants. Since this functional relationship is not known for most materials, these methods are rarely used.

Therefore, with the current state of the art an in situ measurement of temperature of the substrate during coating is either not possible in principle or not practicable.

SUMMARY OF THE INVENTION

It is one object of the invention to provide a method and a suitable arrangement for carrying out the method to enable the simultaneous measurement of the thickness of growing layers and the temperature of the substrate in depositing or coating processes.

According to one aspect of the invention, there is provided a method for determining the thickness of the coating layer and the temperature of the substrate using detected temperature radiation from the substrate being coated during the deposition or the coating of substrates in arrangements for use in the manufacture of semiconductors and in deposition-devices. The method is characterized in that the emissivity of the entire system is determined by a reflectometer according to $\epsilon=1-R$ and the determination of the temperature (T) is according to $$\frac{c_2}{\lambda}\left(\ln\left[1+\frac{1}{\frac{\lambda^5}{c_1}f_{Planck}(\lambda,T_0)\frac{P}{P_0}\frac{1-R_0}{1-R_0\frac{L}{L_0}}}\right]\right)^{-1}$$

whereby the initial temperature ($T_o$) is determined by pyrometry and the thickness (d) of the layer is determined by comparing the reflectivity-curve with the theoretical layer-thickness dependence, $R=f(d)$.

According to another aspect of the invention, there is provided an arrangement for carrying out said method. The arrangement is characterized by: a first detector (7), provided for measuring the intensity of the thermal substrate-radiation in a thermal-radiation-branch (B) and a second detector (8), provided in a reflectometer-branch (A) for detecting reflected radiation, namely radiation radiated from a source of light (6) and reflected from a wafer (1). The source (6) of light of the reflectometer-branch (A) and the thermal radiation of the substrate (1) are mono-chromatized by the same or similar filters (3). The detector (7) is provided with a chopper (11) and a lock-in-amplifier (12). The detector (8) is correspondingly provided with a chopper (9) and a lock-in-amplifier (10).

According to still another aspect of the invention, both parameters—thickness and temperature—may be measured simultaneously, in situ, directly on the surface of the wafer.

According to another aspect of the invention, the method is capable of real time measurement and is specially suited for measurement systems and for process control devices.

According to a further aspect of the invention, the pyrometric detector, used for measuring the temperature radiation, is used in combination with another detector and a laser or some other appropriate light source, e.g. a halogen lamp coupled with an interference filter, for measuring the emissivity of the layered substrate. Said emissivity is dependent upon the actual thickness of the coating layer.

The transmission wavelength of the filter, the wavelength of the laser and the monochromatic source of light, respectively, as well as the angle of incidence are identical.

The in situ determination of the temperature can be described according to the following physical context.

The temperature radiation being emitted from the substrate is reflected and refracted multiple times at the interface of the growing layers. Temperature T being constant, the resulting beams interfere with each other so that the detected signal, received by means of the filter and len systems, oscillates subject to the thickness, d, of the layer.

This phenomenon can be described by using a coefficient of emission $\epsilon(\lambda,T,d)$, being dependent upon the film-thickness, d. The signal at the pyrometer P is then proportional to $$P \sim \epsilon \cdot f_{Planck} = \epsilon \frac{c_1}{\lambda^5} \frac{1}{e^{\frac{c_2}{\lambda T}} - 1}$$

with $c_1 = 3.741 \cdot 10^4$ W cm$^{-2}$ μm$^4$; $c_2 = 1.438 \cdot 10^4$ μm K; $f_{Planck}$ represents Plancks' radiation formula; and, $\lambda$ represents the wavelength. For the signal being normalized to the initial value $P_o$, there is obtained $$\frac{P}{P_0} = \frac{\epsilon \cdot f_{Planck}(\lambda,T)}{\epsilon_0 \cdot f_{Planck}(\lambda,T_0)}$$

whereby $T_o$ represents the temperature at the beginning of the deposition process.

According to Kirchhoff's law, the emission is equal to the absorption, $\epsilon = A$. Because of the law of conservation of energy: reflectivity R+absorption A+transmission TR=1; and in the case of a non-transparent substrate, $\epsilon = 1-R$.

According to one aspect of the invention, the reflectivity R is measured in a reflectometer-branch and the intensity L, which is normalized to the initial value $L_o$, is obtained as $$\frac{L}{L_0} = \frac{R}{R_0}$$

Consequently, one obtains $$\epsilon = 1 - R = 1 - \frac{L}{L_0} \cdot R_0$$

where $R_o$ is the reflection of the unlayered or non-deposited substrate and is obtained by measurement, by calibration or through the literature.

If one uses the detector signals $P/P_o$ and $L/L_o$ (both being normalized with respect to the initial value) one obtains $$\frac{P}{P_0} = \frac{\left(1 - R_0 \cdot \frac{L}{L_0}\right)}{(1 - R_0)} \cdot \frac{\left(\frac{c_1}{\lambda^5}\right)\left(\frac{1}{e^{\frac{c_2}{\lambda T}} - 1}\right)}{f_{Planck}(\lambda,T_0)}$$

by rearranging one obtains equation (1) as presented directly below, which gives the temperature as a function of L and P only:

$$T = \frac{c_2}{\lambda} \left( \ln \left[ 1 + \frac{1}{\frac{\lambda^5}{c_1} f_{Plank}(\lambda,T_0) \frac{P}{P_0} \frac{1-R_0}{1-R_0 \frac{L}{L_0}}} \right] \right)^{-1} \quad (1)$$

This is a unique determination equation ("evaluation rule"), which allows for the determination of the temperature without regard to the growing thickness of the layer or the lack of knowledge of the true material constants.

The initial temperature must be known and can be determined, for example, by pyrometry.

According to an aspect of the invention, the thermal radiation of the substrate and the reflected radiation of the source of light are each measured by a corresponding detector—namely, a phase sensitive modulation means (essentially a lock-in-amplifier)—which measures in one detector branch A, only the reflected radiation of the light source being reflected from the substrate proportionally to the reflectivity R and, in the second detector branch B, only the thermal radiation proportionally to $\epsilon \cdot f_{Planck}$. The phase sensitive modulation means each comprise a chopper, coupled with the lock-in-amplifier.

According to the invention, the light of the light source is provided by the optical modulator or chopper in a small frequency region around $f_1$ and the thermal radiation of the second chopper is modulated around $f_2$. The detector in the reflectometer-branch A detects frequency components around $f_1$ from the reflected radiation as well as very low frequency components, approximately DC components, from the thermal radiation. The corresponding lock-in-amplifier only detects signals in a small band around $f_1$. The low frequency thermal components are therefore filtered out. Therefore the output of the lock-in-amplifier provides a signal which is proportional to the reflectivity R.

The branch B of the detector for the radiation of the substrate operates similarly. The thermal radiation of the corresponding chopper is modulated in a frequency region around $f_2$, while the reflected radiation is in the frequency regions $f_1 + f_2$ and $f_1 - f_2$. The second lock-in-amplifier filters out all components not in a small frequency band around $f_2$. If $f_1$ and $f_2$ are sufficiently different from each other, the output voltage at this lock-in-amplifier is proportional to $\epsilon \cdot f_{Planck}$.

To the detectors there is coupled an analog or digital signal processing means, which determines the actual temperature T from the signals in real time using the evaluation rule according to equation (1). Simultaneously, the thickness of the layer is determined by means of a comparison of the reflectometer-curve and the theoretical layer-thickness-dependence.

The temperature T determined in such a way can be used to control or feedback control the process.

The invention can be applied to known depositing or coating technologies in semiconductor manufacturing arrangements. It can also be used with Plasma-, Ion- and other dry-etching arrangements. Further, it can be used in connection with optical coatings.

According to a further aspect of the invention, the arrangement for measuring comprises: a reflectometer branch A and a substrate radiation branch B for measuring the intensity of the thermal substrate radiation.

Branch B comprises a first detector for detecting the radiated light from a light source. Branch A of the reflectometer comprises a second detector for detecting the reflected light from a wafer.

The radiation from the light source in the reflectometer-branch and the thermal radiation from the substrate is monochromatized by the same or by similar filters. Each detector comprises a chopper and a lock-in-amplifier.

The arrangement for measuring is assembled such that the angle of incidence of the reflectometer light and the angle of monitoring of the pyrometer-branch are substantially equal.

Monochromatic sources may be used as the light source. For example, lasers or monochromatized white-light-sources, i.e., thermal SiC-sources, black body radiators, halogen lights, etc. may be used.

There are several advantages to the inventive concepts of the invention over the capabilities of prior art:

The determination of the emissivity is completely independent of prior knowledge on the material, i.e. neither knowledge of the optical constant nor knowledge of the thickness of the applied layers is necessary to determine the temperature.

For the measurement of the temperature T there is practically no restriction with respect to the type of material involved or the layer thickness. For instance, materials such as semiconductors, including Si, GaAs, InP, InSb, HgTe, CdTe as well as ternary and quarternary systems; insulators; and, metal layers or coatings may be used with the invention. Also, the thickness of the applied layers may be between one layer of atoms and several hundred microns.

The determination is provided in real time. Therefore, according to a further aspect of the invention, it may be used for temperature control of rapidly changing processes (e.g., in rapid thermal processing, RTP).

Simultaneous measurement of the temperature and the thickness of the layer are possible during the process.

The measurement of temperature is neither altered nor influenced by the interference-oscillation of the temperature radiation.

High resolution is achieved with respect to the temperature as well as to the thickness of the layer.

Since only a few commercially available components are necessary, the invention is cost effective.

Furthermore, the invention exploits the general advantages of optical in situ measurements:

no additional handling facility;

insensitive to hostile surroundings; and, good facility for incorporation into vacuum processes.

Fields of application of the inventive concepts are the measuring of the temperature and the thickness of a layer during the processes and associated applications such as the control (feedforward and feedback control) of processes, the monitoring in the depositing and coating technologies, experimental checking of simulation models in basic R&D and the optimization of processes.

The invention will now be described with respect to one example by reference to the accompanying figure, however, such should not to be taken as a limitation on the previously described aspects and objects of the invention.

DETAILED DESCRIPTION OF THE DRAWING

Figure 1:
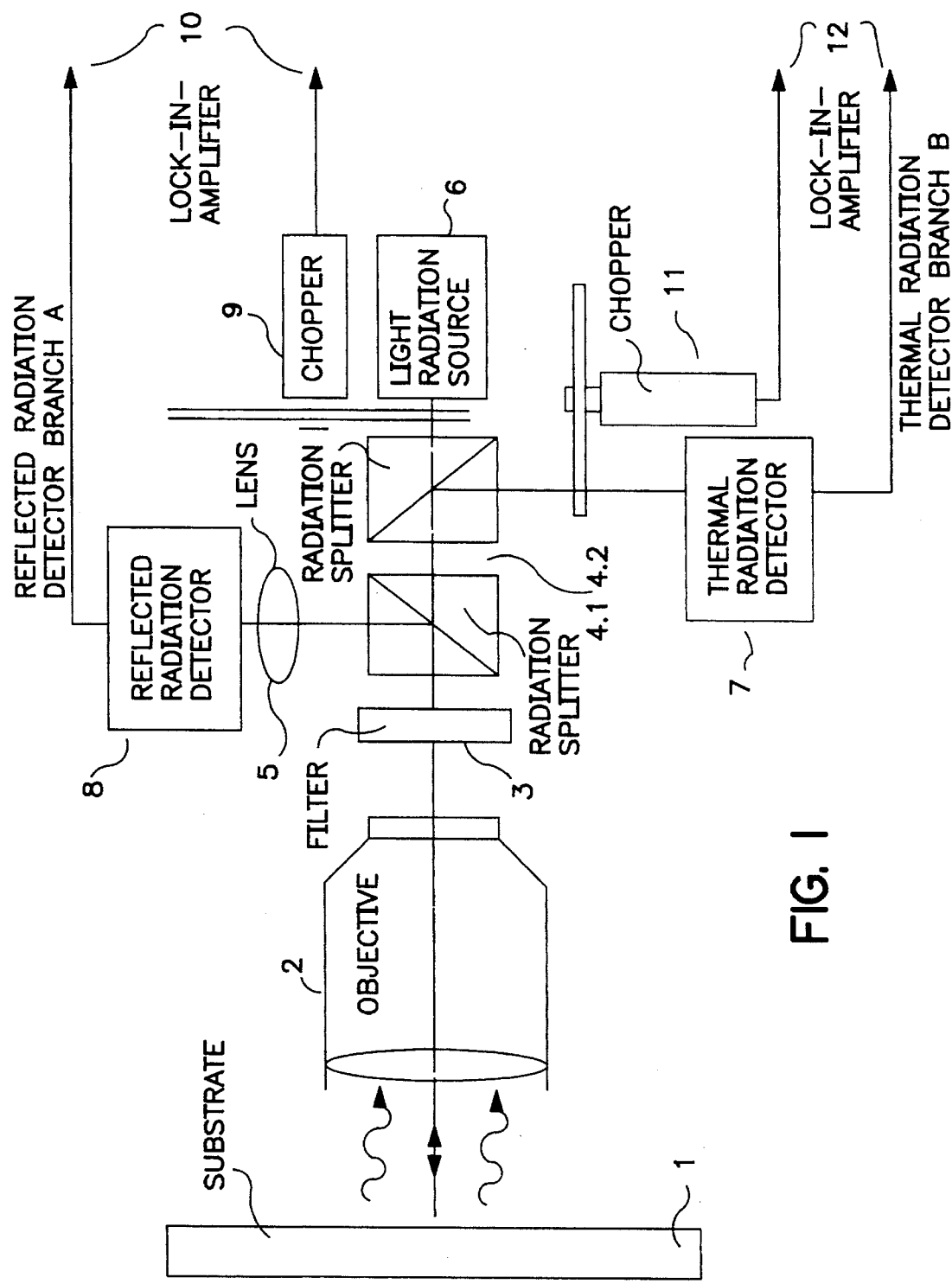
FIG. 1 is a principle schematic representation of one embodiment of the invention.

The components of the measuring arrangement, according to FIG. 1, is suited to the determination of the temperature and comprises the following elements.

The intensity of the thermal radiation of the substrate 1 is monochromatized by a narrow-band interference filter 3 and is measured by means of a first detector 7 for the evaluation of the substrate radiation. Detector 7 is sensitive at the corresponding wavelength. Additionally, the directed radiation of a light source 6 is also monochromatized by filter 3 or, if two interference filters are splitted on the two detector branches A and B, by a transmissionally equivalent filter and irradiated to substrate 1. The reflected light is measured by a second detector 8.

The trace of radiation in the measuring system and, therefore, the arrangement of objective 2, filter 3, radiation splitters 4.1 and 4.2, and lens 5 is made such that both the thermal radiation and the reflected radiation of light source 6 are incident on both detectors 7 and 8. A phase sensitive modulation means (lock-in-amplifier) is used to allow for a measurement in the detector branch B of only the thermal radiation proportional to $\epsilon.f_{Planck}$ and in the other detector branch A a measurement of only the reflected radiation proportional to the reflectivity R. An optical modulator or chopper 9, 11 and a lock-in-amplifier 10, 12 are allocated to each detector.

At detector 8, for the reflected radiation, frequency components around $f_1$ as well as very low-frequency components are received from the thermal radiation of substrate 1. The first components are caused by reflected radiation being emitted by light source 6, mixed to the frequency region around $f_1$ by chopper 9 and reflected by substrate 1. From the lock-in-amplifier 10 corresponding with detector 8 only those signals that are in the frequency band around $f_1$ are registered; therefore, there is a signal at the output of the lock-in-amplifier 10 that is proportional to the reflectivity R.

In branch B the thermal radiation of substrate 1 is received from detector 7 in a similar way. The radiation is modulated to a frequency around $f_2$ by a chopper 11. The output voltage at the lock-in-amplifier 12 is proportional to $\epsilon.f_{Planck}$. The further evaluation is made on the basis of the evaluation rule according to equation (1).

The mentioned measuring arrangement represents only one of several possibilities. In other embodiments, for example, the direction of incidence of the radiation may be other than vertical. In this case, however, both detector branches A and B should be arranged spacially apart from the light source.

We claim:

1. A method for determining a thickness of a layer and a temperature of a substrate during deposition or coating of the substrate in arrangements for the manufacture of semiconductors or in deposition-devices by use of a detected temperature radiation from the substrate when being coated, characterized in that:

(a) the emissivity ($\epsilon$) of the substrate being coated is determined according to equation:

$$\epsilon = 1 - R$$

in which:

$\epsilon$ represents the determined emissivity Of the substrate being coated, and R represents the reflectivity determined by measuring the reflected radiation of the substrate being coated by reflectometry;

(b) the temperature (T) of the substrate is determined according to equation:

$$T = \frac{c_2}{\lambda} \left( \ln \left[ 1 + \frac{1}{\frac{\lambda^5}{c_1} f_{Planck}(\lambda, T_0) \frac{P}{P_0} \frac{1-R_0}{1-R_0 \frac{L}{L_0}}} \right] \right)^{-1}$$

in which:

T represents the determined temperature of the substrate being coated, $T_0$ represents the initial temperature of the substrate measured by pyrometry at the beginning of the deposition or coating, $P_0$ represents the initial thermal radiation of the substrate measured by pyrometry at the beginning of the deposition or coating, P represents the thermal radiation of the substrate being coated measured by pyrometry, $R_0$ represents the initial reflectivity of the substrate before being coated measured by reflectometry, $L_0$ represents the initial intensity of the reflected radiation of the substrate measured by reflectometry at the beginning of the deposition or coating, L represents the intensity of the reflected radiation of the substrate being coated measured by reflectometry, $c_1$ and $c_2$ each independently represent constants, $\lambda$ represents the wavelength of incident radiation comprising mono-chromatic light on the substrate being coated from a light source, and $f_{Planck}(\lambda, T_0)$ represents Planck's radiation formula as a function of wavelength and initial measured temperature of the substrate; and, (c) the thickness (d) of the layer deposited or coated on the substrate is determined by comparing a measured reflectivity, determined by measuring the reflected radiation of the substrate by reflectometry, with a given reflectivity vs. layer-thickness dependence (R=f(d)).

2. The method according to claim 1, characterized in that:

(a) the thermal radiation of the substrate (P, $P_0$) is measured in a thermal radiation branch (B) which comprises a first detector for measuring thermal radiation of the substrate, and the reflected radiation by the substrate (R, $R_0$) of the source of radiation comprising mono-chromatic light is measured in a reflected radiation branch (A) which comprises a second detector for measuring reflected radiation of the light source by the substrate;

(b) phase-sensitive modulation means is provided with each detector, respectively, in which each phase-sensitive modulation means comprises a chopper and a lock-in-amplifier coupled therewith;

(c) in which said phase-sensitive modulation means provides that in one detector-branch (A) only the reflected radiation of the source of light, being reflected radiation from the substrate, is measured proportionally to reflectivity (R) and in said other detector-branch (B) only thermal radiation is measured proportionally to $\epsilon.f_{Planck}$; and, (d) further in which said detectors are coupled to a digital signal processing means or analog processing means, being operative to determine the temperature (T) of the substrate from the detector signals in real time, applying the temperature (T) determination equation.

3. The method according to claim 1, characterized in that:

(a) the light of the light source is provided by the chopper in branch (A) in a first frequency region around $f_1$ corresponding to the reflected radiation and the lock-in-amplifier only registers around $f_1$, thereby filtering out thermal radiation frequency components and providing an output signal which is proportional to the reflectivity (R);

(b) the thermal radiation is modulated by the chopper in branch (B) in a second frequency region around $f_2$ corresponding to the thermal radiation and the lock-in-amplifier only registers around $f_2$, thereby filtering out reflected radiation frequency components and providing an output signal which is proportional to $\epsilon.f_{Planck}$.

4. The method according to claim 1, characterized in that:

(a) the determined temperature (T) is used for controlling a process for deposition or coating of substrates in the manufacture of semi-conductors.

5. The method according to claim 1, characterized in that:

(a) the substrate is a semi-conductor wafer.

6. An apparatus for determining a thickness of a layer and a temperature of a substrate during deposition or coating of the substrate in arrangements for the manufacture of semi-conductors or in deposition-devices by use of a detected temperature radiation from the substrate when being coated, comprising:

(a) a first detector for measuring the intensity of the thermal radiation of a substrate in a pyrometer-branch (B);

(b) a second detector for detecting reflected radiation, radiated from a source of light and reflected from the substrate in a reflectometer-branch (A);

(c) at least one filter for mono-chromatizing the source of light of the reflectometer-branch (A) and the thermal radiation of the substrate; and, (d) in which the first detector is provided with a chopper as well as with a lock-in-amplifier and the second detector is correspondingly provided with a chopper as well as with a lock-in-amplifier.

7. The apparatus according to claim 6, characterized in that: the angle of incidence of the light of the reflectometer branch (A) and the angle of monitoring of the pyrometer branch (B) are substantially equal.

8. The apparatus according to claim 6, characterized in that: said source of light comprises mono-chromatic sources selected from the group consisting of lasers, white-light sources, global bar sources (SiC), black-body-radiators, and halogen-lamps.

9. The apparatus according to claim 6, characterized in that: both detector-branches (A;B) are spaced apart from said light-source, when said radiation is incident on the substrate in a non-perpendicular way.

* * * * *